(12) United States Patent
Anderson

(10) Patent No.: US 8,431,098 B2
(45) Date of Patent: Apr. 30, 2013

(54) GAS PURIFICATION USING PHOTOCATALYTIC VORTEX-SUSPENDED PARTICLES

(75) Inventor: Kraig Anderson, Burlingame, CA (US)

(73) Assignee: Empire Technology Development LLC, Wilmington, DE (US)

(*) Notice: Subject to any disclaimer, the term of this patent is extended or adjusted under 35 U.S.C. 154(b) by 0 days.

(21) Appl. No.: 13/377,085

(22) PCT Filed: Jul. 14, 2011

(86) PCT No.: PCT/US2011/044046
§ 371 (c)(1),
(2), (4) Date: Dec. 8, 2011

(87) PCT Pub. No.: WO2013/009321
PCT Pub. Date: Jan. 17, 2013

(65) Prior Publication Data
US 2013/0017135 A1 Jan. 17, 2013

(51) Int. Cl.
*A61L 9/20* (2006.01)
*B01D 45/12* (2006.01)
*B01J 19/08* (2006.01)
*B01J 19/12* (2006.01)

(52) U.S. Cl.
USPC .............. 423/210; 422/4; 422/121; 422/122; 422/129; 422/186.3; 204/157.3; 55/447; 55/459.1

(58) Field of Classification Search .................. 423/210; 422/4, 121, 122, 129, 186.3; 204/157.3; 55/447, 459.1
See application file for complete search history.

(56) References Cited

U.S. PATENT DOCUMENTS

| | | | | |
|---|---|---|---|---|
| 5,439,652 | A * | 8/1995 | Sczechowski et al. | .... 422/186.3 |
| 5,790,934 | A * | 8/1998 | Say et al. | ...... 422/186 |
| 7,594,941 | B2 | 9/2009 | Zheng et al. | |
| 7,594,947 | B2 | 9/2009 | Omori | |
| 2002/0029955 | A1 | 3/2002 | Sahle-Demessie | |
| 2005/0069464 | A1 | 3/2005 | Obee | |
| 2008/0075627 | A1 * | 3/2008 | Garin et al. | ...... 422/4 |
| 2008/0131331 | A1 | 6/2008 | Josserand et al. | |
| 2010/0047117 | A1 | 2/2010 | Bernard | |

(Continued)

FOREIGN PATENT DOCUMENTS

CN 2753378 1/2006

OTHER PUBLICATIONS

Sczechowski et al., "A Taylor vortex reactor for heterogeneous photocatalysis" Chemical Engineering Science, 1995, 50(20), 3163-3173.

(Continued)

*Primary Examiner* — Timothy Vanoy
(74) *Attorney, Agent, or Firm* — Foley & Lardner LLP

(57) ABSTRACT

Embodiments of the technology disclosed herein include exemplary gas purifiers that use cyclonic separation and photocatalytic purification to oxidize contaminants in unpurified gas. One such gas purifier includes a vessel that defines a tapered cyclonic chamber. Unpurified gas enters the chamber and induces a gas vortex. Photocatalytic particles in the chamber become suspended in the vortex and mix with contaminants in the incoming gas. A light source activates the photocatalytic particles, which oxidize the contaminants to purify the gas. The purified gas exits via the wide of end of the chamber. Cyclonic action forces the photocatalytic particles out of the chamber's narrow end to a recycling conduit, which conveys the photocatalytic particles back into the chamber.

33 Claims, 2 Drawing Sheets

U.S. PATENT DOCUMENTS

2010/0209294 A1    8/2010   Owen et al.
2011/0250099 A1*  10/2011   Bagwell et al. ............ 422/186.3
2012/0076700 A1*   3/2012   Liptak ........................ 422/186.3

OTHER PUBLICATIONS

International Search Report and Written Opinion for PCT/US2011/044046 dated Oct. 25, 2011.
Buell Refinery Cycles "Third Stage Cyclone Separators" [http://www.buellrefinery.com/pdf/third_stage_separtors.pdf] [retrieved on Nov. 29, 2011] 4 pages.
Dometic Marine Division, "In-Duct Breath Easy Air Purifier" [http://www.dometic.com/bba1e4b3-c671-4ed2-b9e8-cb50178f43e3.fodoc] [retrieved on Nov. 29, 2011] 2 pages.
Fry, "Visible and near-ultraviolet absorption spectrum of liquid water" Applied Optics, 2000, 39(16), 2743-2744.
Gregg, "High Efficiency Cyclones for Powder Processing Applications" Adv. Filtration and Separation Technology, 1995 vol. 9, p. 240.
Martigoni, "Evaluation of cyclone geometry and its influence on performance parameters by computational fluid dynamics (CFD)". Braz. J. Chem. Eng. vol. 24 No. 1 Jan./Mar. 2007.
Matthews, "Photooxidation of organic impurities in water using thin films of titanium dioxide," J. Phys. Chem., 1987, 91 (12), pp. 3328-3333. DOI: 10.1021/j100296a044.
Ogawa, "Mechanical Separation Process and Flow Patterns of Cyclone Dust Collectors" Ind. Applied Mech. Ver. 1997, vol. 50, n. 3, p. 97.
Stairmand, (1951). "The Design and Performance of Cyclone Separators" Eng Res Design 1951, 29, 356-383. (first page only).
Vortex Ventures "Particle Separation" [http://www.vortexventures.com/systems-products/particle-separation.html] [retrieved on Nov. 29, 2011] 1 page.

\* cited by examiner

GAS PURIFICATION USING PHOTOCATALYTIC VORTEX-SUSPENDED PARTICLES

CROSS-REFERENCE TO RELATED APPLICATIONS

The present application is a U.S. national stage application claiming the benefit of International Application No. PCT/US2011/044046, filed on Jul. 14, 2011, the entire contents of which is incorporated herein by reference in their entirety.

BACKGROUND

Cyclonic separation is a method of separating particles from a gas without filtration. Gas is injected into a cylindrical or conical cyclone chamber, setting up a high speed rotating flow, which begins at one end of the chamber and ends at the other end of the chamber; the flow then reverses direction and exits up the center of the cyclone via an out an exit at the top of the cyclone chamber. Particles can be separated by density using commercially available vortex/cyclone type particle separators.

SUMMARY

In illustrative embodiments of gas purification using photocatalytic particles suspended in a gas vortex, a vessel defines a chamber that contains photocatalytic particles. An inlet to the chamber admits a gas flow that induces a gas vortex in the chamber to suspend at least some of the photocatalytic particles, which contact contaminants in the gas stream. A light source, such as a window, lamp, or light-emitting diode (LED), activates the suspended photocatalytic particles, e.g., by inducing oxidation of the contaminants contacted to the suspended photocatalytic particles. An outlet discharges the gas flow from the chamber.

Exemplary chambers may have a cut point, defined as the size of particle removed from the gas vortex at 50% efficiency, that is equal to or greater than about 10 µm. In illustrative methods, particles having diameters greater than the cut point are removed from the gas vortex with greater than 50% efficiency. Exemplary chambers may also be tapered, i.e., they may have a radius that decreases along their length. For instance, a tapered chamber may be in the shape of a cone, conical frustum, paraboloid, or hyperboloid.

Illustrative photocatalytic particles used in embodiments of the present technology may include titanium dioxide or any other suitable photocatalytic material. The diameter of each photocatalytic particle can be about 1 µm to about 100 µm; e.g., the photocatalytic particles can have an average diameter of about 10 µm. In some examples, the cut point can be selected to be about 10 µm, 20 µm, or 30 µm below the average particle diameter.

In some illustrative embodiments, the gas flow admitted to the chamber includes contaminated air. Illustrative gas purifiers may include a conduit coupled between the inlet and an end of the chamber to convey photocatalytic particles that fall out of the gas vortex back into the chamber, where the photocatalytic particles can re-enter the gas vortex. In some cases, a trap may collect particles conveyed into or through the conduit on the basis of size and/or electrostatic properties.

Exemplary gas purification may including collecting particles below a threshold size, such as about 1 µm, about 4 µm, or about 10 µm, at the outlet of the chamber. Particle collection can be performed with a filter, electrostatic trap or the like.

Illustrative gas purifiers according to alternative embodiments of the present technology include a vessel that defines a chamber, an inlet to admit a gas flow into the chamber, and a conduit coupled between the inlet and an end of the chamber. The gas flow induces a gas vortex in the chamber to suspend particles within the chamber. The conduit conveys at least some of the particles that fall out of the gas vortex back into the chamber. An outlet discharges the gas flow from the chamber.

The foregoing summary is illustrative only and is not intended to be in any way limiting. In addition to the illustrative aspects, embodiments, and features described above, further aspects, embodiments, and features will become apparent by reference to the following drawings and the detailed description.

DETAILED DESCRIPTION

An irradiated vortex of photocatalytic particles can be used to purify gases, such as air, exhaust, effluent, agricultural emissions, or industrial emissions, of chemical, biological, and particulate contamination. Sized particles are cycled through a vortex in a cyclone chamber. Contaminated or unpurified gas enters the chamber, is purified by the photo catalyst, which may be selected depending on the contaminant, and exits the chamber as purified gas. The vortex suspension provides a large, continually refreshed photoreactive surface in a compact volume since all surfaces of the photocatalytic particles are available for reaction, and they are constantly being mixed and exposed (and re-exposed) to the radiation, which may be ultraviolet (UV) illumination. Dwell time is increased by the continuous mixing of the vortex process.

Compared to other gas purification techniques, embodiments of the present technology make more efficient use of an extremely large photoreactive surface area in a compact volume. Exemplary cyclone chambers have no moving parts, so they are energy efficient and do not require much maintenance. Catalyst maintenance can be as simple as replacing old particles with new ones.

Illustrative gas purifiers can be configured for centralized, stand-alone, or portable operation, such as in buildings or vehicles, or even wearable air purifiers (e.g., for working with paint fumes, etc.). For instance, exemplary purifiers are well-suited for drop-in integration to existing centralized air handling systems, such as those used in residential and commercial buildings, hospitals, clean rooms, etc., and in portable air purification for rooms, vehicles, etc. Illustrative gas purification can be performed with a wide variety of inexpensive and nontoxic photocatalysts, such as titanium dioxide ($TiO_2$), and with illuminations from a wide variety of sources, e.g., the sun, light-emitting diodes (LEDs), lamps, etc.

Cyclone Gas Purification and "Cut Points"

Figure 1:
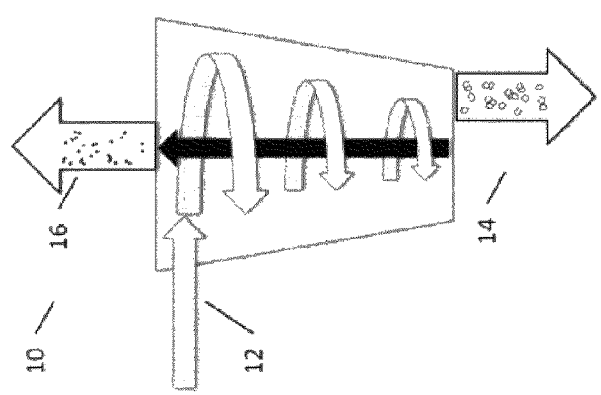
FIG. 1 is a schematic diagram of a conventional cyclone chamber.

FIG. 1 schematically outlines the function of a single cyclone chamber 10. A gas flow 12 containing particles of various sizes is directed into cyclone chamber 10, which may be cylindrical or conical, in such a way as to create a circular cyclone with a net downwards motion as indicated by the broad white arrows. Illustrative chambers 10 can be made of metal (e.g., sheet metal) or any other suitable material. As the flow 12 progresses down the chamber 10, particles with greater inertia (i.e., particles that are larger and/or denser) impact the walls of the cyclone chamber 10, then slide or fall to the bottom of the chamber 10. This occurs because larger (denser) particles in the rotating stream have too much inertia to follow the tight curve of the stream and strike the outside wall, then fall to the bottom of the cyclone where they can be removed. Larger (denser) particles are removed at higher efficiency than smaller (less dense) particles. The size of particle removed from the chamber 10 with 50% efficiency is defined as the chamber's "cut point," and depends on the flow rate of the gas in the cyclone and the geometry of the chamber 10. Larger (denser) particles are removed at higher efficiency, and smaller (less dense) particles are removed with lower efficiency. The cut point can be varied by changing the gas flow rate and/or by changing the shape of the chamber 10.

At the bottom of the chamber 10, the cyclone is reflected to direct the gas stream up, through the "eye" or center of the downward cyclone, as indicated by the black arrow. Particles larger than the cut point flow out of the chamber 10 via a discharge stream 14. Thus, particles smaller than the "cut point" of the cyclone tend to remain suspended in the gas flow and leave cyclone chamber 10 via exit 16.

Gas Purification with Vortex-Suspended Photocatalytic Particles

Exemplary embodiments of the present technology use cyclonic particle separator technology in combination with photocatalytic purification. In cyclonic particles technology, where particles (of a particular size and density) are suspended or entrained in the vortex, but are then separated out of the air stream by a decreasing radius of the cyclone chamber. In conventional cyclonic particle separator technology, this effect is used to reject or collect particles based on size. Here, it is used to recycle photocatalytic particles.

Exemplary gas purification involves entraining photocatalytic particles and contaminated gas in a stable vortex. Contaminants in the gas contact the photocatalytic particles in the gas vortex, e.g., through adsorption to the surfaces of the photocatalytic particles. Irradiation of the photocatalytic particles activates the photocatalytic particles, e.g., by generating reactive species which act to degrade contaminants; for example, UV irradiation of photocatalytic $TiO_2$ generates reactive singlet oxygen at the surface of the photocatalytic $TiO_2$. Conventionally, such particles are included in surface coatings, which limits the photoreactive area to the exposed surface of the particles on the coating. By contrast, the vortex suspension of the present technology allows access to all surface areas of the particles by both UV illumination and contaminated air. Furthermore, because of mixing in the vortex, far more particles can be actively used in the vortex than in a coating of a chamber of the same size. The vortex allows a very large effective photoreactive surface area to be contained within a compact volume—e.g., between 100 and 1000 times that of a comparable surface coating.

Figure 2:
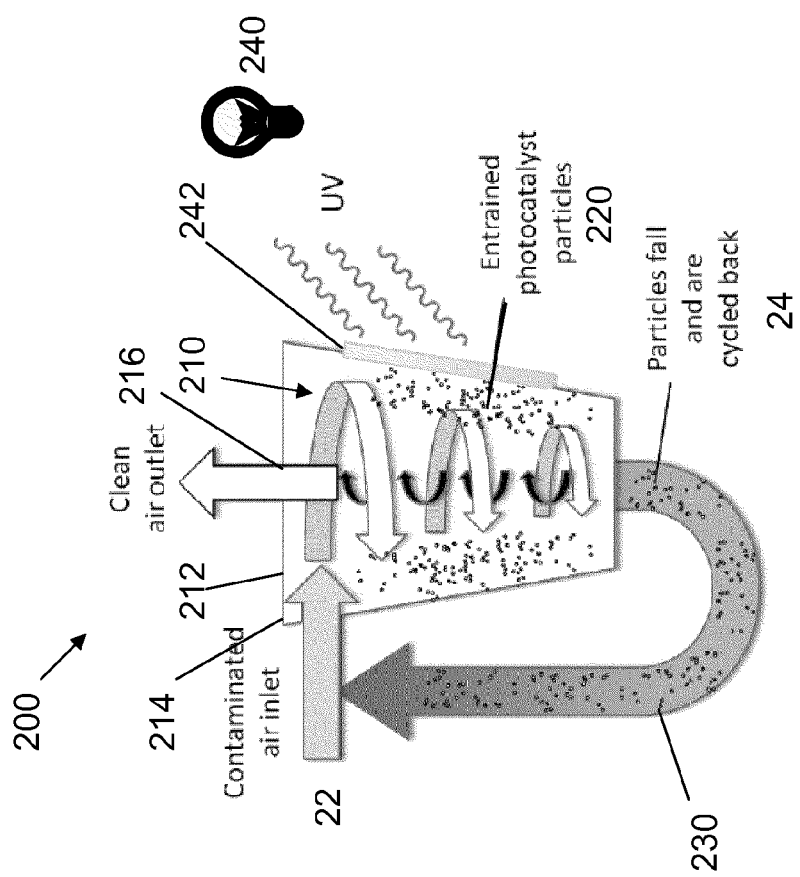
FIG. 2 is a schematic diagram of an exemplary gas purifier according to an embodiment of the present technology.

FIG. 2 shows a diagram of a gas purification apparatus 200 according to an illustrative embodiment of the present technology. A gas flow 22 of contaminated air or another contaminated gas enters a chamber 210, which is defined by a vessel 212, via an inlet 214. The gas flow 22 induces a gas vortex in the chamber 210. In some examples, the chamber 210 is tapered along its longitudinal axis, i.e., the radius of the chamber 210 decreases along an axis perpendicular to the velocity of the gas flow 22. For instance, the walls of the chamber 210 may form a cone, conical frustum, hyperboloid, paraboloid, or any other suitably shaped surface. The chamber 210 can have a cut point of about 4 μm to about 10 μm, or larger. Specific examples of cut points include about 4 μm, about 5 μm, about 6 μm, about 7 μm, about 8 μm, about 9 μm, about 10 μm, or ranges between any two of these values. Further examples may have cut points of about 20 μm, about 25 μm, about 30 μm, about 35 μm, or about 40 μm.

Photocatalytic particles 220 disposed within the chamber 210 become entrained in the gas vortex and mix with contaminants (e.g., volatile organic compounds, solvents, hydrocarbons, airborne bacteria, and/or airborne viruses) and other particles in the gas flow 22. The photocatalytic particles 220 can be introduced into the chamber 210 before the gas flow 22 is initiated, or simply added to the inlet 214 with the gas flow 22. Contaminants in the gas vortex contact the photocatalytic particles 220 and may adsorb or otherwise adhere to the photocatalytic particles 220 during mixing.

Suitable photocatalytic particles 220, including but not limited to $TiO_2$ particles, are widely available in a variety of compositions, which are selected depending on the expected contamination, price, and so on. As an example, $TiO_2$ particles are inexpensive, nontoxic, effective on a broad range of airborne contaminants, and can be activated by many light sources, e.g., the sun, LEDs, high-intensity lamps, etc. Alternatively, or in addition, the photocatalytic particles may include, for example, a semiconductor that may exhibit photocatalytic activity upon irradiation, e.g., with ultraviolet light or visible light. Examples include compounds of metal elements with oxygen, nitrogen, sulfur and/or fluorine. Examples of the metal element include Ti, Zr, Hf, V, Nb, Ta, Cr, Mo, W, Mn, Tc, Re, Fe, Co, Ni, Ru, Rh, Pd, Os, Ir, Pt, Cu, Ag, Au, Zn, Cd, Ga, In, Tl, Ge, Sn, Pb, Bi, La, Ce. Examples of the compound include one or more oxides, nitrides, sulfides, oxynitrides, oxysulfides, nitrogen fluorides, oxyfluorides, nitrogen oxyfluorides of the above metals. In some examples, suitable catalysts include, for example: oxides of titanium, zirconium, zinc, tungsten, tin; barium titanate, barium strontianite, lead barium titanate, lead zirconate, or the like. Among them, oxides of Ti, W, or Nb are preferred, and metatitanic acid, titanium oxide, tungsten oxide, etc. are particularly preferred. The photocatalyst may be used alone, or two or more kinds of them may be used in combination. The photocatalyst can be combined with various dopants, for example: phosphoric acid, ferric chloride, triethyl amine, trifluoroacetic acid, thiourea, silver nitrate, silver acetate, copper nitrate, copper sulphate, boric acid and combinations thereof; other metals, for example, the metal elements listed herein above; other metal oxides, for example: zinc oxide, platinum oxide, magnesium oxide and/or aluminum oxide; or the like. In some examples, suitable catalysts include anatase titanium dioxide or rutile titanium dioxide.

Preferably, photocatalytic particles 220 may have large surface areas relative to their volumes. For example, they may be approximately spherical with rough or corrugated surfaces. The photocatalytic particles 220 may have diameters of from about 1 μm to about 100 μm. In some examples, the photocatalytic particles 220 have an average diameter of greater than 4 μm, e.g., about 10 μm. Specific examples of average diameters of the photocatalytic particles include about 4 μm, about 5 μm, about 10 μm, about 20 μm, about 30 μm, about 40 μm, about 50 μm, about 60 μm, about 70 μm, about 80 μm, about 90 μm, about 100 μm, and ranges between any two of these values. The photocatalytic particles can be all of about the same size, or can have a distribution of sizes. It is not necessary to start with a precisely sized particle distribution because the cyclonic action of the gas vortex in the chamber 210 removes particles that are too large or too small from the gas vortex as described below.

At least one light source 240 illuminates the photocatalytic particles 220 at one or more wavelengths or a range of wavelengths that activate the photocatalytic particles 220. In certain examples, the light source emits light at one or more UV wavelengths. The exact wavelength(s) or range of wavelengths depend(s) on the composition of the photocatalyst. For example, suitable wavelengths for titanium dioxide may range from about 190 nm to about 400 nm. Irradiation at a single wavelength may also be effective; for example, titanium dioxide has been used as a photocatalyst under laser irradiation at 355 nm. Depending on the photocatalyst, other wavelength ranges may be suitable. For example, titanium dioxide doped with nitrogen ions or tungsten trioxide may have photocatalytic activity under visible light. The light source 240, which may include one or more LEDs, a lamp, or the sun, emits light that enters the chamber 210 via a transparent window 242 in one wall of the vessel 212. Other devices may be used, such as light pipes, mirrors, etc., to direct light from the source 240 into the chamber 210. Alternatively, suitably compact, long-life sources (e.g., UV-LEDs) may be installed inside the chamber 210 itself.

Absorption of the transmitted light by the photocatalytic particles 220 is believed to yield reactive singlet oxygen on the surfaces of the photocatalytic particles 220. The reactive singlet oxygen oxidizes contaminants contacted to the particles 220, purifying the contaminated air. The vortex mixing and particle rotation constantly exposes the contaminant-contacted surfaces of the particles 220 to the irradiation from the light source 240. Consequently, the entire surface area of each particle 220 (that is accessible to both the incident light and contaminants in the gas flow 22) can be effective as a photocatalyst.

As the particles suspended in the gas vortex propagate through the camber 210, the decreasing radius of the chamber increases the effective centrifugal force on the particles. Large or dense contaminants (i.e., particles sized larger than the cut point) impact the walls of the chamber 210 and exit the narrow end of the chamber. This cyclone-induced separation discriminates by particle size, rather than by particle type, so the particles that fall out of the chamber 210 may include photocatalytic particles 220, contaminants, and other particles. In some cases, the size of the photocatalytic particles 220 is chosen to be equal to or greater than the chamber cut point such that at least some of the photocatalytic particles 220 fall out of the vortex.

A recycling conduit 230 coupled to the narrow end of the chamber 210 feeds the particles that have fallen out of the vortex back into the gas flow 22 admitted to the inlet 214. In some cases, the particles travelling through the conduit 230 are filtered to prevent contaminants from being recycled along with photocatalytic particles. For example, the recycling conduit 230 may include an optional electrostatic filter (not shown) that screens particles based on their electrical properties and/or a trap that filters particles based on momentum. The recycled photocatalytic particles 220 remain in the conduit until they reach the inlet 214, at which point they re-enter the gas vortex in the chamber 210 to mix with and purify the contaminated gas in the chamber 210.

Purified gas, such as purified air, exits the chamber 210 via an outlet 216 at the wide end of the chamber 210. Another optional electrostatic filter (not shown) coupled to the outlet 216 removes smaller particles from the exiting gas. For instance, the other optional electrostatic filter may trap particles with a diameter of about 4 µm or less because such particles often have undesired physiological effects. The purified gas is then routed to its destination.

The photocatalytic particles 220 can be replaced according to a regular schedule or on an as-needed basis to ensure proper operation of the purifier 200. After a period of time when the photocatalyst particles 220 have lost activity (or many contaminant particles of the same size have become co-trapped in the vortex), the gas flow 22 is cut off, and all the particles in the chamber 220 fall to the bottom of the chamber 220 and are removed. Alternatively, if the photocatalytic particles 220 are larger than the chamber cut point, inactive photocatalytic particles 220 can be cycled out of the chamber 210 continuously, periodically, or on an as-needed basis by disconnecting the recycling line 230 from the inlet 214. Fresh photocatalytic particles 220 can be loaded into the chamber 210 via the inlet 214 to replace the discarded photocatalytic particles 220.

Compared to cyclone chambers whose walls are coated with photocatalyst, the embodiments of the technology disclosed herein offer better performance with less onerous maintenance. For example, the active surface area in cyclone chambers coated with photocatalyst is limited by the inner surface area of the duct, whereas embodiments of the present technology have an active surface limited only by the number and size of photocatalytic particles suspended in the gas vortex. Coating cyclone chambers with thicker layers of catalyst is ineffective since typical catalysts (e.g., $TiO_2$) absorb UV light, so activation only occurs near the surface, and the airstream only contacts the catalyst surface. The photocatalyst area could be increased by extending the catalyst coating throughout the ducts, but this increases the expense and difficulty of illumination. Moreover, typical ducts are not shaped for maintaining an energy-efficient vortex, particularly considering the twists and turns typical of installation. Finally, photocatalyst replacement is costly and burdensome, since it involves replacing or recoating the ductwork.

EXAMPLE 1

Cyclonic Photocatalytic Particle Air Purifier Kits

Unlike catalyst loaded filters, cyclonic particle separators do not impede the flow of gas through the system. Consequently, embodiments of the present technology can be retrofit more easily to existing air handling systems without disrupting than filters coated with photocatalyst. In one example, a conventional cyclone chamber, such as the chamber 10 shown in FIG. 1, is modified to perform photocatalytic gas purification using an illustrative kit of the present technology. First, the cyclone chamber is modified by adding one or more quartz windows and a recycling line that connects the lower particle outlet and upper air inlet of the cyclone chamber. Next, air is directed to the input to start the cyclone. A collection of $TiO_2$ particles having high surface area and average diameter of 10 µm is added to the input of the chamber and is suspended in the cyclone. Most of the particles eventually fall out of the cyclone according to their size/density and the reducing radius of the cyclone, enter the recycling outlet, and are directed (with additional airflow) back to the inlet to enter the cyclone again. On first adding the photocatalyst particles, a small fraction of particles about or less than 1 micrometer pass through the outlet and are captured by an electrostatic filter.

A bank of high intensity UV-LEDs positioned outside the cyclone chamber illuminates the particles in the chamber through quartz windows in the sides of the chamber. Contaminated air is directed through the cyclone chamber, and the airborne contaminants adsorb on the surface of the $TiO_2$ particles. The UV illumination activates the surface of the photocatalyst particles, and through the mixing of the vortex and rotation of the particles, at least some of the contaminant-adsorbed particle surfaces are photoactivated. The resulting singlet oxygen and hydroxyl radical species oxidize the adsorbed contaminants, purifying the air in the chamber. The purified air exits the cyclone and is directed through the attached air handling system. Proper operation of the modified cyclone chamber is verified by comparing spectroscopic measurements of the unpurified gas at the inlet to the purified gas discharged from the outlet.

EXAMPLE 2

Fume Hood

In another illustrative example, a cyclone chamber at least partially filled with photocatalytic particles is used to filter exhaust vented from a fume hood in a laboratory or classroom. A fan or pressure differential forces fumes and/or vapors emanating from chemicals in the fume hood into a duct connected to the inlet of the cyclone chamber. For example, negative pressure may suck vapors from uncovered solvents in the fume hood into the The fumes/vapors enter the cyclone chamber, where they circulate with and adsorb onto a collection of roughly spherical $TiO_2$ particles. An ultraviolet lamp illuminates the $TiO_2$ particles, which causes the $TiO_2$ particles to oxide solvents and other adsorbed materials. The oxidation reaction purifies the exhaust from the fume hood, and the purified exhaust may be vented into the atmosphere.

The herein described subject matter sometimes illustrates different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality, and any two components capable of being so associated can also be viewed as being "operably couplable," to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim 1ncludes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations).

Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.).

It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

The foregoing description of illustrative embodiments has been presented for purposes of illustration and of description. It is not intended to be exhaustive or limiting with respect to the precise form disclosed, and modifications and variations are possible in light of the above teachings or may be acquired from practice of the disclosed embodiments. It is intended that the scope of the invention be defined by the claims appended hereto and their equivalents.

What is claimed is:

1. A gas purifier comprising:
   a vessel defining a chamber, the chamber having a radius that decreases along a length of the chamber;
   photocatalytic particles disposed within the chamber;
   an inlet to admit a gas flow into the chamber, the gas flow inducing a gas vortex in the chamber to suspend at least some of the photocatalytic particles, the suspended photocatalytic particles contacting contaminants in the gas stream;
   a light source to activate the suspended photocatalytic particles; and
   an outlet to discharge the gas flow from the chamber.

2. The gas purifier of claim 1, wherein the chamber has a cut point greater than about 10 µm.

3. The gas purifier of claim 1, wherein the chamber is in the shape of a cone, conical frustum, paraboloid, or hyperboloid.

4. The gas purifier of claim 1, wherein at least some of the photocatalytic particles include titanium dioxide.

5. The gas purifier of claim 1, wherein the diameter of each of the photocatalytic particles is about 1 μm to about 100 μm.

6. The gas purifier of claim 1, wherein the photocatalytic particles have an average diameter of about 10 μm.

7. The gas purifier of claim 1, wherein the gas flow includes contaminated air.

8. The gas purifier of claim 1, further including a conduit coupled between the inlet and an end of the chamber, the conduit conveying photocatalytic particles that fall out of the gas vortex back into the chamber.

9. The gas purifier of claim 1, further including a trap to collect particles below a threshold size at the outlet.

10. The gas purifier of claim 9, wherein the threshold size is about 1 μm.

11. The gas purifier of claim 9, wherein the trap includes an electrostatic filter.

12. The gas purifier of claim 1, wherein the light source includes at least one of a light-emitting diode, a lamp, and a window.

13. A method for purifying a gas flow, comprising:
admitting the gas flow into a chamber having a radius that decreases along a length of the chamber so as to induce a gas vortex in the chamber, the gas vortex suspending photocatalytic particles that contact contaminants in the gas flow;
irradiating the suspended photocatalytic particles so as to activate the suspended photocatalytic particles; and
discharging the gas flow from the chamber.

14. The method of claim 13, wherein the gas flow includes contaminated air.

15. The method of claim 13, wherein the chamber is in the shape of a cone, conical frustum, paraboloid, or hyperboloid.

16. The method of claim 13, wherein the gas vortex induces removal of particles having diameters greater than about 10 μm from the gas flow.

17. The method of claim 13, wherein at least some of the photocatalytic particles include titanium dioxide.

18. The method of claim 13, wherein the diameter of each of the photocatalytic particles is between about 1 μm and about 100 μm.

19. The method of claim 13, wherein the photocatalytic particles have an average diameter of about 10 μm.

20. The method of claim 13, further including conveying photocatalytic particles that fall out of the gas vortex back into the gas vortex.

21. The method of claim 13, wherein irradiating the suspended photocatalytic particles includes activating an ultraviolet (UV) source.

22. The method of claim 21, wherein the UV source includes at least one of a light-emitting diode, a lamp, and a window.

23. The method of claim 13, wherein discharging the gas flow further includes trapping particles below a threshold size.

24. The method of claim 23, wherein the threshold size is about 1 μm.

25. The method of claim 23, wherein trapping particles occurs electrostatically.

26. A gas purifier comprising:
a vessel defining a chamber, the chamber having a radius that decreases along a length of the chamber;
an inlet to admit a gas flow into the chamber, the gas flow inducing a gas vortex in the chamber to suspend particles within the chamber;
a conduit coupled between the inlet and an end of the chamber to convey at least some particles that fall out of the gas vortex back into the chamber; and
an outlet to discharge the gas flow from the chamber.

27. The gas purifier of claim 26, wherein the chamber has a cut point greater than about 10 μm.

28. The gas purifier of claim 26, wherein the gas flow includes contaminated air.

29. The gas purifier of claim 26, further including a trap coupled to at least one of the inlet, the conduit, and the end of the chamber to collect particles above a threshold size.

30. The gas purifier of claim 26, further including a trap to collect particles below a threshold size at the outlet.

31. The gas purifier of claim 30, wherein the threshold size is about 1 μm.

32. The gas purifier of claim 30, wherein the trap includes an electrostatic filter.

33. The gas purifier of claim 26, further including a light source to irradiate the particles suspended in the gas vortex.

* * * * *

UNITED STATES PATENT AND TRADEMARK OFFICE
CERTIFICATE OF CORRECTION

PATENT NO.         : 8,431,098 B2
APPLICATION NO.    : 13/377085
DATED              : April 30, 2013
INVENTOR(S)        : Anderson It is certified that error appears in the above-identified patent and that said Letters Patent is hereby corrected as shown below:

On the Title Page, item (57), under "ABSTRACT", in Column 2, Line 10, delete "wide of end" and insert -- wide end --, therefor.

On Title Page 2, item (56), under "OTHER PUBLICATIONS", in Column 2, Line 2, delete "1995 vol." and insert -- 1995, vol. --, therefor.

On Title Page 2, item (56), under "OTHER PUBLICATIONS", in Column 2, Line 4, delete "(CFD)"." and insert -- (CFD)", --, therefor.

On Title Page 2, item (56), under "OTHER PUBLICATIONS", in Column 2, Line 5, delete "Eng. vol. 24 No. 1 Jan./Mar." and insert -- Eng., vol. 24, No. 1, Jan./Mar. --, therefor.

On Title Page 2, item (56), under "OTHER PUBLICATIONS", in Column 2, Line 8, delete "3333." and insert -- 3333, --, therefor.

On Title Page 2, item (56), under "OTHER PUBLICATIONS", in Column 2, Line 10, delete "Mech." and insert -- Mech., --, therefor.

On Title Page 2, item (56), under "OTHER PUBLICATIONS", in Column 2, Line 12, delete "(1951)." and insert -- (1951), --, therefor.

On Title Page 2, item (56), under "OTHER PUBLICATIONS", in Column 2, Line 13, delete "Eng Res" and insert -- Eng. Res. --, therefor.

In the Specification

In Column 1, Line 63, delete "including" and insert -- include --, therefor.

Signed and Sealed this
Twenty-fourth Day of December, 2013

Margaret A. Focarino
*Commissioner for Patents of the United States Patent and Trademark Office*

CERTIFICATE OF CORRECTION (continued)
U.S. Pat. No. 8,431,098 B2

In Column 5, Line 32, delete "camber" and insert -- chamber --, therefor.

In Column 6, Line 4, delete "chamber 220 fall to the bottom of the chamber 220" and insert -- chamber 210 fall to the bottom of the chamber 210 --, therefor.

In Column 7, Line 19, delete "The fumes/vapors" and insert -- . The fumes/vapors --, therefor.

In Column 8, Line 8, delete "Includes" and insert -- includes --, therefor.

In the Claims

In Column 10, Line 36, in Claim 31, delete "claim 30," and insert -- claim 29, --, therefor.

In Column 10, Line 38, in Claim 32, delete "claim 30," and insert -- claim 29, --, therefor.